US010528937B2

(12) United States Patent
Murali et al.

(10) Patent No.: US 10,528,937 B2
(45) Date of Patent: Jan. 7, 2020

(54) CONDUCTING A TRANSACTION BETWEEN A SERVICE PROVIDER AND A MERCHANT

(71) Applicant: MASTERCARD ASIA PACIFIC PTE. LTD., Singapore (SG)

(72) Inventors: Manohar Murali, Singapore (SG); Rajen Srinivasa Prabhu, Singapore (SG); Chayan Hazra, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 988 days.

(21) Appl. No.: 14/801,065

(22) Filed: Jul. 16, 2015

(65) Prior Publication Data

US 2016/0019520 A1    Jan. 21, 2016

(30) Foreign Application Priority Data

Jul. 16, 2014    (SG) .............................. 10201404145T

(51) Int. Cl.
*G06Q 20/22* (2012.01)
*G06Q 20/38* (2012.01)
*G06Q 20/02* (2012.01)

(52) U.S. Cl.
CPC ............. *G06Q 20/22* (2013.01); *G06Q 20/02* (2013.01); *G06Q 20/385* (2013.01)

(58) Field of Classification Search
CPC ............................. G06Q 20/22; G06Q 20/02
USPC .......................................................... 705/39
See application file for complete search history.

(56) References Cited

U.S. PATENT DOCUMENTS

| | | | | |
|---|---|---|---|---|
| 8,639,846 B2* | 1/2014 | Singh | .................. | H04L 63/0263 709/246 |
| 9,185,234 B2* | 11/2015 | Horel | ...................... | G06Q 20/16 |
| 9,704,155 B2* | 7/2017 | McCullagh | .......... | G06Q 20/363 |
| 2007/0136183 A1* | 6/2007 | Roon | ...................... | G06Q 40/04 705/37 |

* cited by examiner

*Primary Examiner* — Jessica Lemieux
(74) *Attorney, Agent, or Firm* — Buchanan Ingersoll & Rooney PC

(57) ABSTRACT

According to one aspect of the disclosure, there is provided a method for conducting a transaction between a service provider and a merchant, the method comprising: issuing an account number against which a transaction with the merchant is made, wherein the account number belongs to a subscriber registered with the service provider; assigning a unique reference used to map the subscriber to the account number; and transmitting, upon receiving use of the account number for the transaction, the unique reference and details of the transaction to the service provider, wherein the unique reference is processed against a database of unique references to identify the subscriber to which the account number belongs, for the service provider to associate the transaction to the identified subscriber, based on the details of the transaction. A service provider server, a server network and a system that implements this method is also disclosed.

18 Claims, 8 Drawing Sheets

CONDUCTING A TRANSACTION BETWEEN A SERVICE PROVIDER AND A MERCHANT

TECHNICAL FIELD OF DISCLOSURE

The following discloses arrangements for conducting a transaction between a telecommunication service provider and a merchant.

BACKGROUND

Transactions made over the Internet typically require for a consumer to have a payment card; or a digital wallet, which is an account registered with a payment service provider (such as PayPal™) that is linked to a source of funds, that can make the payment for such transactions. An example of such transactions would be the purchase of software applications that are designed to operate in a smart phone, the transaction being performed using the smart phone.

There exists a pool of consumers who have access to a smart phone, but do not have access to a payment card or cannot enroll with a payment service provider. To tap this pool of consumers, several software application merchants have tied up with telecommunication service providers to offer direct carrier billing. Direct carrier billing is a method of payment that charges payment directly to a consumer's telephone bill. However, for a telecommunication service provider to provide direct carrier billing services to subscribers, its systems have to be integrated with the merchant systems. Such integration is complicated and time consuming, which could discourage a telecommunication service provider from offering a direct carrier billing service, since the cost to undertake the integration may outweigh the revenue benefits obtained from offering this service.

There thus is a need to more readily have a service provider, such as a telecommunication service provider, allow their subscribers to make online transactions on the basis of their registration with the service provider.

SUMMARY

According to one aspect of the disclosure, there is provided a method for conducting a transaction between a service provider and a merchant, the method comprising: issuing an account number against which a transaction with the merchant is made, wherein the account number belongs to a subscriber registered with the service provider; assigning a unique reference used to map the subscriber to the account number; and transmitting, upon receiving use of the account number for the transaction, the unique reference and details of the transaction to the service provider, wherein the unique reference is processed against a database of unique references to identify the subscriber to which the account number belongs, for the service provider to associate the transaction to the identified subscriber, based on the details of the transaction.

According to one aspect of the disclosure, there is provided a service provider server for conducting a transaction with a merchant, the service provider server comprising: at least one processor; and at least one memory including computer program code; the at least one memory and the computer program code configured to, with the at least one processor, cause the service provider server at least to: receive details of the transaction and a unique reference assigned to an account number against which the transaction is made, the unique reference used to map the account number to a subscriber registered with the service provider to which the account number belongs, process the unique reference against a database of unique references to identify the subscriber to which the account number belongs, and associate the details of the transaction to the identified subscriber.

According to one aspect of the disclosure, there is provided a server network for facilitating a transaction between a service provider and a merchant, the server comprising: at least one processor; and at least one memory including computer program code; the at least one memory and the computer program code configured to, with the at least one processor, cause the server network at least to: assign a unique reference that is used to map an account number issued to a subscriber registered with the service provider, wherein a transaction with the merchant is made against the account number, and transmit, upon receiving use of the account number for the transaction, the unique reference and details of the transaction to the service provider, wherein the unique reference is processed against a database of unique references to identify the subscriber to which the account number belongs, for the service provider to associate the details of the transaction to the identified subscriber.

According to one aspect of the disclosure, there is provided a system for conducting a transaction between a service provider and a merchant, the system comprising: a server network comprising: at least one processor; and at least one memory including computer program code; the at least one memory and the computer program code configured to, with the at least one processor, cause the server network at least to assign a unique reference that is used to map an account number issued to a subscriber registered with the service provider, wherein a transaction with the merchant is made against the account number; and transmit, upon receiving use of the account number for the transaction, the unique reference and details of the transaction to the service provider; and a service provider server comprising: at least one processor; and at least one memory including computer program code; the at least one memory and the computer program code configured to, with the at least one processor, cause the service provider server at least to receive the details of the transaction and the unique reference; process the unique reference against a database of unique references to identify the subscriber to which the account number belongs; and associate the details of the transaction to the identified subscriber.

BRIEF DESCRIPTION OF THE DRAWINGS

Embodiments of the disclosure will be better understood and readily apparent to one of ordinary skill in the art from the following written description, by way of example only, and in conjunction with the drawings, in which.

DETAILED DESCRIPTION

Figure 1:
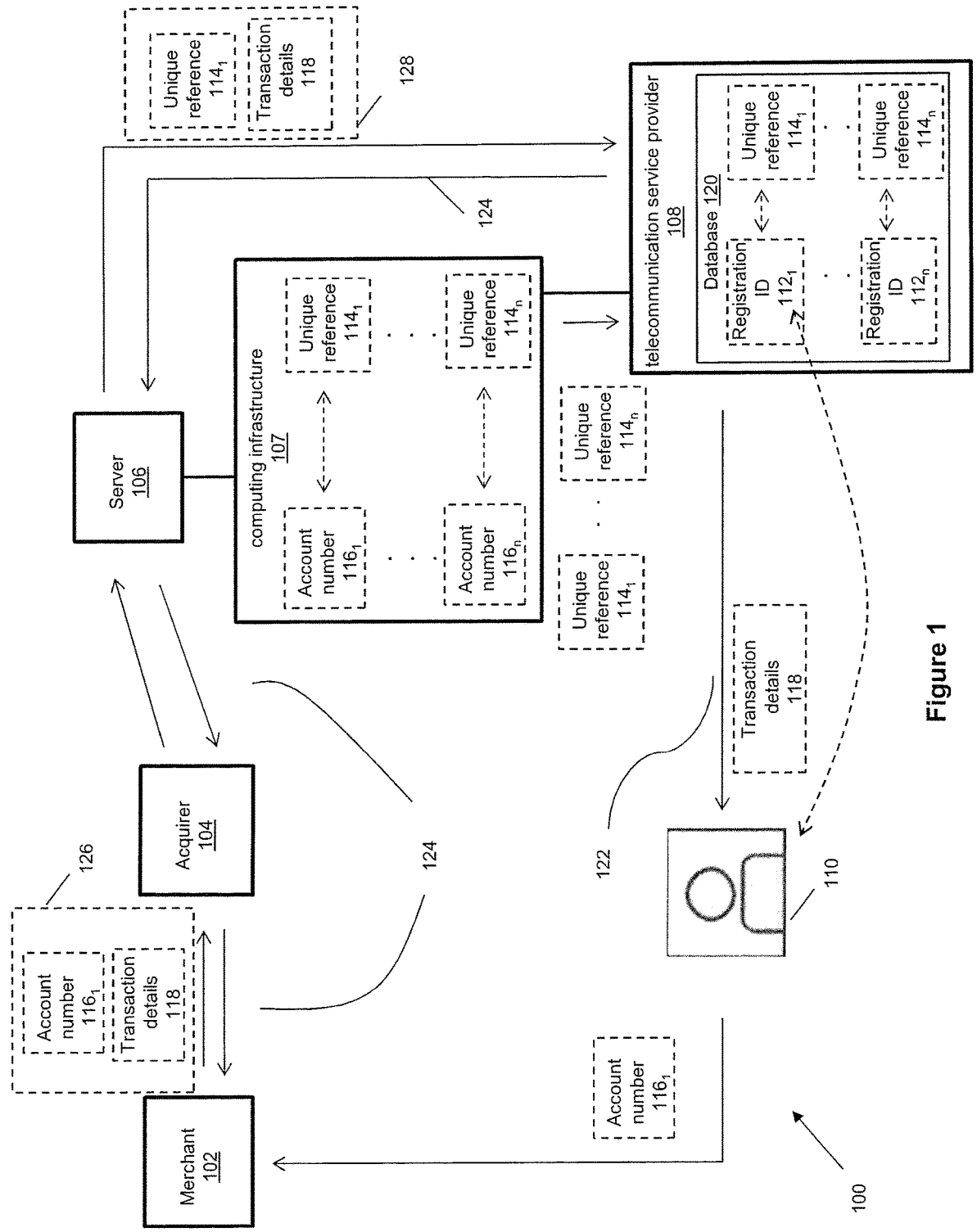
FIG. 1 shows a schematic of a system for conducting a transaction between a service provider, such as a telecommunication service provider, and a merchant.

In the following description, various embodiments of the disclosure are described, by way of example only, with reference to the drawings, where like reference characters generally refer to the same parts throughout the different views. A transaction between a service provider and a merchant is described, where the service provider may be any one or more of a telecommunication service provider, a financial services provider or an online service provider. In FIG. 1, the working principles underlying such a transaction are described with reference to a telecommunication service provider, where it will be appreciated that the same working principles apply for other service providers, such a financial services provider and an online service provider.

FIG. 1 shows a schematic of a system 100 that allows a transaction between a telecommunication service provider 108 and a merchant 102. The telecommunication service provider 108 provides a subscriber 110, registered with the telecommunication service provider 108, access to telephone and related communications services. Each registered subscriber 110 may be identified using, for example, the subscriber's mobile telephone number. The merchant 102 may be a business offering goods or services being the subject of the transaction with the telecommunication service provider 108. The goods include tangible products (such as clothes and groceries) and intangible products (such as software applications) for installation into a computing platform (such as a mobile phone). The transaction involves the purchase of goods or services offered by the merchant 102, with the purchase being initiated by the registered subscriber 110. The transaction may be performed electronically, such as over the Internet, with no need for the registered subscriber 110 to physically visit the merchant 102 to complete the transaction. The merchant 102 also receives immediate payment for the transaction, not from the registered subscriber 110, but rather, from the telecommunication service provider 108 through the payment network provided by an acquirer 104 and a server 106 (described in further detail below). Accordingly, the merchant 102 may include one or more computer terminals/servers to process such an electronic transaction.

The system 100 further includes an acquirer 104 and a server 106 to facilitate the transaction between the merchant 102 and the telecommunication service provider 108.

The acquirer 104 is a party that determines whether the merchant 102 meets the criteria that allows for the merchant 102 to use the infrastructure provided by the financial services provider to which the server 106 belongs. The acquirer 104 processes transactions that the registered subscriber 110 makes with the merchant 102 and performs financial settlement between the telecommunication service provider 108 and the acquirer 104 through the server 106.

The server network, to which the server 106 belongs, provides the architecture that facilitates the transaction between the telecommunication service provider 108 and the merchant 102, where the transaction is initiated by a subscriber 110 registered with the telecommunication service provider 108. The server 106 facilitates the transaction by recognizing, amongst all processed transactions, those that are made by the subscriber 110 registered with the telecommunication service provider 108. Such recognition may be performed as described in what follows, being a preferred implementation of a transaction between the telecommunication service provider 108 and the merchant 102.

Consider a subscriber 110, who is a customer with the telecommunication service provider 108 and wishes to use the telecommunication service provider 108 as a source of funds to initiate a transaction. The subscriber 110 needs to register to the fund facility service that the telecommunication service provider 108 provides. The subscriber 110 may be identified to the telecommunication service provider 108 using a registration ID $112_1$, such as the mobile telephone number of the subscriber 110. However, this registration ID $112_1$ cannot be directly used by the registered subscriber 110 to perform transactions, such as purchasing of goods or services, with a merchant 102 because the registration ID $112_1$ is not recognized by the merchant 102. To perform such transactions with the merchant 102, the transactions need to be made against an electronic format that the merchant recognizes. An exemplary electronic format would be an account number $116_1$ in a configuration recognizable by the merchant 102. Such an account number $116_1$ is issued to the subscriber 110 to be used against transactions made with the merchant 102, i.e., they provide the subscriber 110 with a payment instrument for transactions made with the merchant 102. In one exemplary implementation, the account number $116_1$ is accessed from a mobile device (such as a smart phone) used by the subscriber 110. In such an implementation, the account number $116_1$ may be provided by an electronic card used by an installed application in the mobile device. The electronic card may have a virtual card number. The account number $116_1$ is in a format that when processed indicates that the transactions made against the account number $116_1$ are to be paid by the telecommunication service provider 108 via the acquirer 104.

However the account number $116_1$ against which the transactions is made is not recognized by the telecommunication service provider 108, so that the transactions—paid for by the telecommunication service provider 108—cannot be associated back to the registered subscriber 110 for billing purposes based on the account number $116_1$ alone. To circumvent this, a unique reference $114_1$ is used to map the registration ID $112_1$ of the subscriber 110 to the account number $116_1$ issued to the subscriber 110. The unique reference $114_1$, which may be assigned by computing infrastructure 107 in communication with the server 106, allows for the identification of the subscriber 110 to which the account number $116_1$ belongs because the telecommunication service provider 108 has a database 120 of unique references $114_1, \ldots, 114_n$, each assigned to a registration ID $112_1, \ldots, 112_n$ of a respective subscriber 110. The unique reference $114_1$ is processed against the database 120, where a match then identifies the subscriber 110 to which the account number $116_1$ belongs. In one implementation, the unique reference $114_1$ is generated by the computing infrastructure 107 and the unique reference $114_1$ is assigned by the server 106. Accordingly, the server 106 is configured to assign a unique reference $114_1, \ldots, 114_n$ that is used to map an account number $116_1, \ldots, 116_n$ to the registration ID $112_1$ assigned to the subscriber 110. As explained above, the subscriber 110 is assigned his registration ID $112_1$ by the telecommunication service provider 108, while a transaction with the merchant 102 is made against the account number $116_1$ that is mapped to the registration ID $112_1$ by way of the unique reference $114_1$.

During subscriber 110 registration, the following may occur. An account number issuance request may be made to the telecommunication service provider 108. The telecommunication service provider 108 sends the request to the computing infrastructure 107 requesting for an account number to be generated. The computing infrastructure 107 then generates the account number $116_1$, against which the unique reference $114_1$ is designated, and stores it together with the unique reference $114_1$ for future exchange. The unique reference $114_1$ is shared with the telecommunication service provider 108, through the server 106 or directly from the computing infrastructure 107. The telecommunication service provider 108 then assigns this unique reference $114_1$ to the subscriber 110 registration ID $112_1$. In this manner, the unique reference $114_1$ maps the subscriber 110 to the account number $116_1$. This process is repeated for each subscriber registration, so that the telecommunication service provider 108 is provided with a plurality of unique references $114_1, \ldots, 114_1$. By having the database 120 of unique references $114_1, \ldots, 114_n$, the telecommunication service provider 108 is configured to recognise the unique references (such as unique reference $114_1$) that are assigned by the server 106. The mapping functionality provided by the unique references $114_1, \ldots, 114_n$ is integral to facilitating a transaction funded by the telecommunication service provider 108 because they serve as data that is shared between the telecommunication service provider 108 and the computing infrastructure 107, which can be processed by both the telecommunication service provider 108 and the computing infrastructure 107. Due to the confidential and sensitive nature of registration ID $112_1, \ldots, 112_n$, they are typically prevented from being shared by regulations of a country in which the telecommunication service provider 108 is located. Similarly, the account number $116_1, \ldots, 116_n$, is also restricted data that is not shared by the computing infrastructure 107 to another party. Thus the unique references $114_1, \ldots, 114_n$ provide a means for communication between the computing infrastructure 107 and the telecommunication service provider 108 that facilitates the transaction funded by the telecommunication service provider 108 to the merchant 102.

After the subscriber 110 makes one or more transactions against the account number $116_1$, the account number $116_1$ and details 118 of the transaction are sent, via the acquirer 104 to the server 106 for processing. The details 118 of the transaction may include data that when processed provides information on the amount paid for the goods or services purchased from the merchant 102 and also a list of the goods or services purchased from the merchant 102. While FIG. 1 shows an implementation having the account number $116_1$ and details 118 of the transaction as two separate sets of data, an alternative implementation has the account number $116_1$ being provided as part of the details 118 of the transaction.

The account number $116_1$ and details 118 of the transaction may be packaged into a data packet 126 that is first received by the acquirer 104 before being sent to the server 106. The server 106 may recognize the account number $116_1$ as being in a format which facilitates a transaction between the telecommunication service provider 108 and the merchant 102. Upon receiving use of the account number $116_1$ for the transaction, through receipt of the data packet 126, the server 106 sends the data packet 126 to be processed by the computing infrastructure 107. The computing infrastructure 107 performs the mapping and sends the unique reference $114_1$, along with details 118 of the transaction, as a data packet 128 to the telecommunication service provider 108, via the server 106. Accordingly, the unique reference $114_1$ and details 118 of the transaction are transmitted by the server 106 to the telecommunication service provider 108.

When the telecommunication service provider 108 receives details 118 of the transaction and the unique reference $114_1$ assigned to the account number $116_1$ against which the transactions were made, the unique reference $114_1$ is processed against the database 120 of unique references $114_1, \ldots, 114_n$ to identify the subscriber 110 to which the account number $116_1$ belongs. After the subscriber 110 is identified, the telecommunication service provider 108 releases payment for the transactions through the acquirer 104 and the server 106, as depicted using the arrows labeled with the reference numeral 124. The details of the transaction 118 are also associated 122 to the identified subscriber 110 for subsequent billing.

Use of the term 'server' herein may be understood to mean a single computing device or a plurality of interconnected computing devices which operate together to perform a particular function. That is, the server may be contained within a single hardware unit or be distributed among several or many different hardware units.

Figure 2:
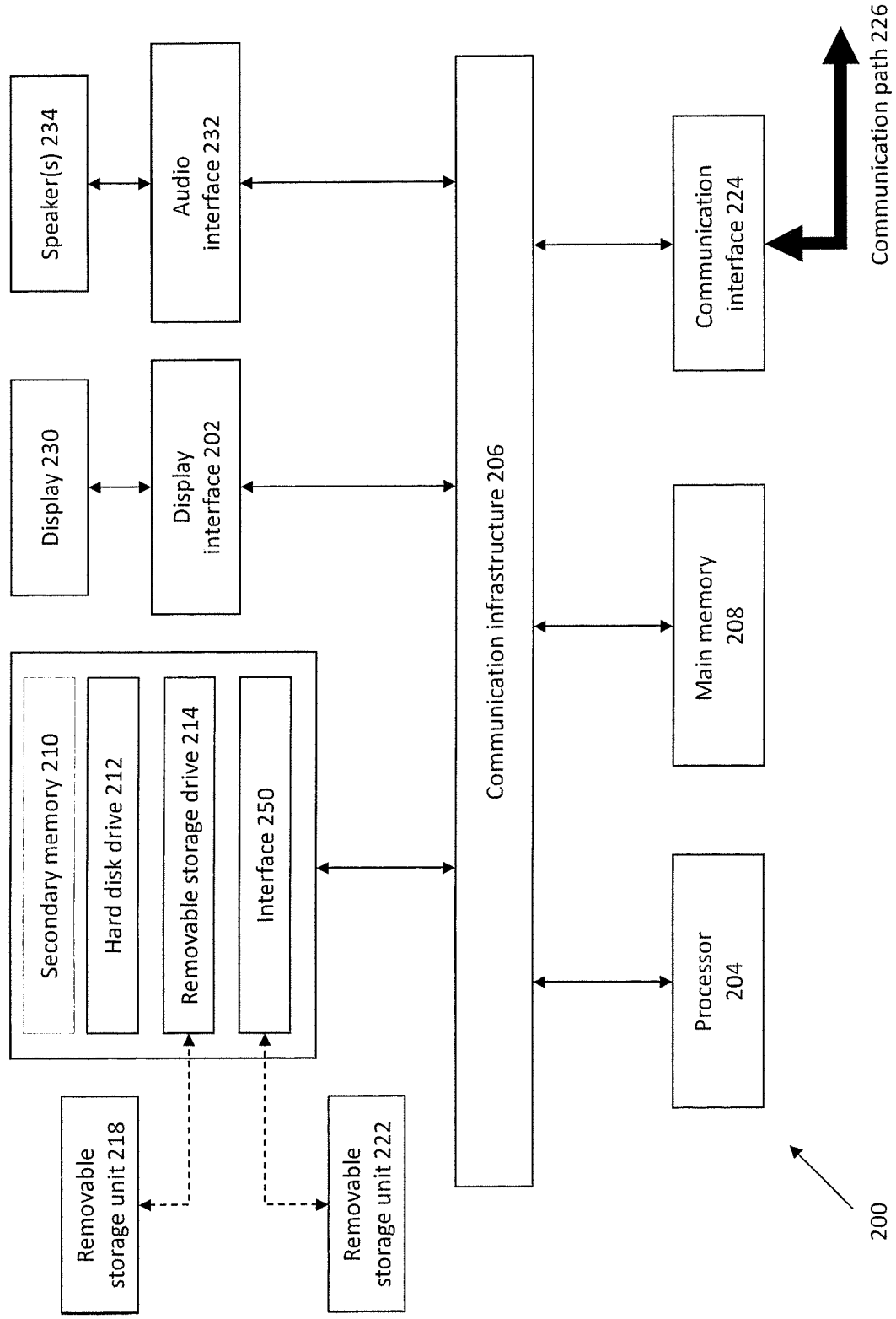
FIG. 2 shows an exemplary computing device to realize the server, which facilitates the transaction between the telecommunication service provider and the merchant, shown in FIG. 1.

FIG. 2 shows an exemplary computing device 200, to realize the computing infrastructure 107 supporting the server 106 shown in FIG. 1. The following description of the computing device 200 is provided by way of example only and is not intended to be limiting. Therefore, one or more elements/components of the computing device 200 may be omitted. Also, one or more elements/components of the computing device 200 may be combined together. Additionally, one or more elements/components of the computing device 200 may be split into one or more component parts.

With reference to FIG. 2, the exemplary computing device 200 includes a processor 204 for executing software routines. Although a single processor is shown for the sake of clarity, the computing device 200 may also include a multiprocessor system. The processor 204 is connected to a communication infrastructure 206 for communication with other components of the computing device 200. The communication infrastructure 206 may include, for example, a communications bus, cross-bar, or network.

The computing device 200 further includes a main memory 208, such as a random access memory (RAM), and a secondary memory 210. The secondary memory 210 may include, for example, a hard disk drive 212 and/or a removable storage drive 214, which may include a floppy disk drive, a magnetic tape drive, an optical disk drive, or the like. The removable storage drive 214 reads from and/or writes to a removable storage unit 218 in a well-known manner. The removable storage unit 218 may include a floppy disk, magnetic tape, optical disk, or the like, which is read by and written to by removable storage drive 214. As will be appreciated by persons skilled in the relevant art(s), the removable storage unit 218 includes a computer readable storage medium having stored therein computer executable program code instructions and/or data.

In an alternative implementation, the secondary memory 210 may additionally or alternatively include other similar means for allowing computer programs or other instructions to be loaded into the computing device 200. Such means can include, for example, a removable storage unit 222 and an interface 250. Examples of a removable storage unit 222 and interface 250 include a program cartridge and cartridge interface (such as that found in video game console devices), a removable memory chip (such as an EPROM or PROM) and associated socket, and other removable storage units 222 and interfaces 250 which allow software and data to be transferred from the removable storage unit 222 to the computing device 200.

The computing device 200 also includes at least one communication interface 224. The communication interface 224 allows software and data to be transferred between computing device 200 and external devices via a communication path 226. In various embodiments of the disclosure, the communication interface 224 permits data to be transferred between the computing device 200 and a data communication network, such as a public data or private data communication network. The communication interface 224 may be used to exchange data between different computing devices 200 which such computing devices 200 form part an interconnected computer network. Examples of a communication interface 224 can include a modem, a network interface (such as an Ethernet card), a communication port, an antenna with associated circuitry and the like. The communication interface 224 may be wired or may be wireless. Software and data transferred via the communication interface 224 are in the form of signals which can be electronic, electromagnetic, optical or other signals capable of being received by communication interface 224. These signals are provided to the communication interface via the communication path 226.

As shown in FIG. 2, the computing device 200 further includes a display interface 202 which performs operations for rendering images to an associated display 230 and an audio interface 232 for performing operations for playing audio content via associated speaker(s) 234.

As used herein, the term "computer program product" may refer, in part, to removable storage unit 218, removable storage unit 222, a hard disk installed in hard disk drive 212, or a carrier wave carrying software over communication path 226 (wireless link or cable) to communication interface 224. A computer readable medium can include magnetic media, optical media, or other recordable media, or media that transmits a carrier wave or other signal. These computer program products are devices for providing software to the computing device 200.

The computer programs (also called computer program code) are stored in main memory 208 and/or secondary memory 210. Computer programs can also be received via the communication interface 224. Such computer programs, when executed, enable the computing device 200 to perform one or more steps that initiate the transaction between a service provider and a merchant (such as the telecommunication service provider 108 and the merchant 102 described above with reference to FIG. 1). The computer programs, when executed, enable the processor 204 to facilitate the transaction between the service provider and the merchant through the payment network provided by an acquirer and a server. Accordingly, such computer programs may represent controllers of the computing device 200.

Software may be stored in a computer program product and loaded into the computing device 200 using the removable storage drive 214, the hard disk drive 212, or the interface 250. Alternatively, the computer program product may be downloaded to the computing device 200 over the communications path 226. The software, when executed by the processor 204, causes the computing device 200 to perform the necessary operations to execute the method as shown in FIG. 3.

Figure 3:
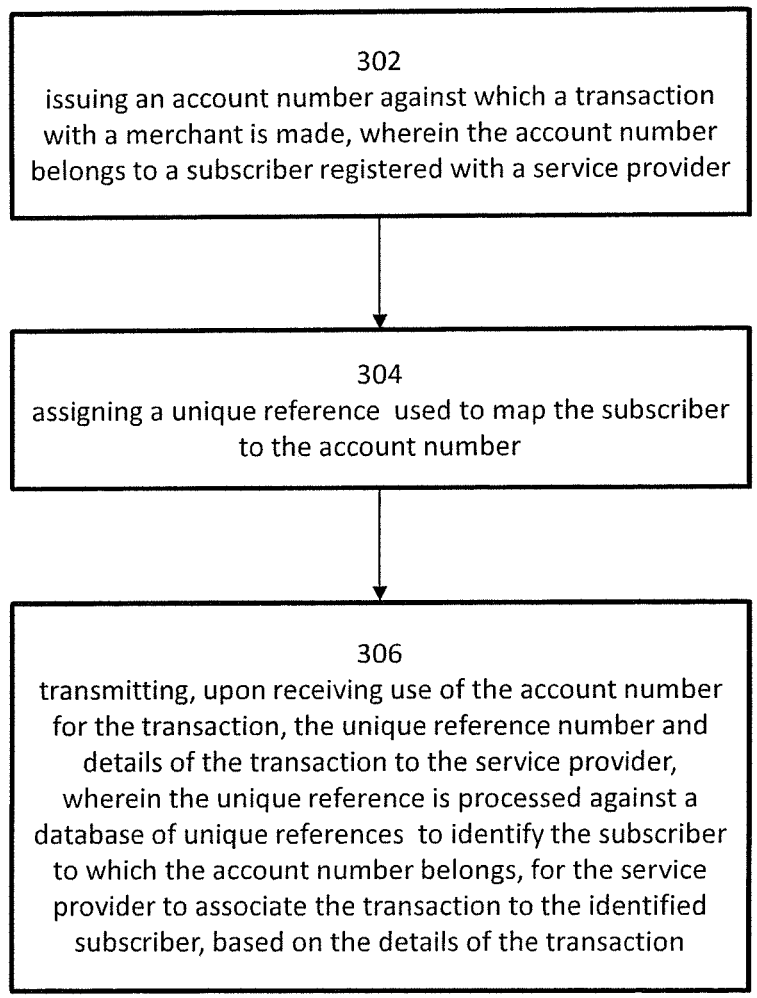
FIG. 3 shows a flowchart depicting steps of a method that allows a service provider to perform a transaction with a merchant.

With reference to FIG. 2, the method according to the flow chart shown in FIG. 3 may be implemented as software and stored in a non-transitory fashion in the secondary memory 210 or the removable storage units 218, 222 of the computing device 200. The software is executable by the processor 204 of the computing device 200. The method allows for the conducting of the transaction between a service provider and a merchant (see the telecommunication service provider 108 and the merchant 102 of FIG. 1), through a payment network provided by an acquirer and a server (see the acquirer 104 and the server 106 of FIG. 1). The method includes the following steps as detailed below.

Now turning to FIG. 3, in step 302, an account number, against which a transaction with a merchant is made, is issued. The account number belongs to a subscriber registered with the service provider. A registration ID may identify the subscriber registered with the service provider and with reference to FIG. 2, one implementation has the account number issued by the processor 204. Issuance of the account number by the processor 204 may be initiated by the service provider, for example when the subscriber requests from the service provider that this account number be created. The service provider will then send a message to the processor 204 to issue and provide the subscriber with the account number.

In step 304, a unique reference, used to map the subscriber to the account number, is assigned. With reference to FIGS. 1 and 2, the unique reference may be assigned by the processor 204, where the processor 204 may also perform the mapping.

In step 306, upon receiving use of the account number for the transaction, the unique reference and details of the transaction are transmitted to the service provider. With reference to FIGS. 1 and 2, the processor 204 may transmit the unique reference and details of the transaction to the service provider. The unique reference is then processed against a database of unique references to identify the subscriber to which the account number belongs. This allows for the service provider to associate the transaction to the identified subscriber, based on the details of the transaction.

In one implementation which uses an application based service and where the service provide is a telecommunication service provider, the transaction effected by the method of FIG. 3 is accessed through any communication device, such as a smart phone, which is provided with the account number of step 302 of FIG. 3. The account number may be made available to the mobile device from installing a software application that is configured to allow the mobile device to participate in the transaction brought about by the method of FIG. 3. The account number may be stored in the mobile device in the form of a virtual electronic card configured to facilitate the method of FIG. 3. However, the method of FIG. 3 may be implemented using any other channels such as SMS and e-mail, where the account number may be stored in any suitable electronic format. Thus, the method described in FIG. 3 may give a subscriber to a telecommunication service provider a cashless payment option for purchases made through their mobile device. This additional mode of cashless payment is advantageous especially for software applications that are designed for a smart phone operating system because making the telecommunication service provider (against which the smart phone is registered) the immediate payment party to the merchant offering the software applications allows the telecommunication service provider to provide a further service to the smart phone user, in addition to allowing the smart phone to access telephone and related communications services.

With the telecommunication service provider being able to extend the credit line required from websites before a purchased good is released, the method of FIG. 3 thus allows access to a pool of telecommunication service provider subscribers that do not own a credit or debit card or do not wish to provide details of their credit or debit card when making website purchases. A holder of a credit card account can also utilize the method of FIG. 3 by having the credit line drawn from the telecommunication service provider, rather than from an issuer of the credit card account.

From associating the transaction back to the subscriber that made the purchase, the telecommunication service provider may be reimbursed in one of two exemplary ways. In a first example, where the subscriber uses a prepaid service with the telecommunication service provider, the purchases may be directly deducted from the balance in the prepaid account. In a second example, the purchases that are made may appear in a monthly telecommunication bill that is issued by the telecommunication service provider to the registered subscriber (also known as "direct carrier billing").

Direct carrier billing implemented by a known application, such as "Google Play" from Google™ is as follows. After the "Google Play" application from Google Play™ store is installed into a smart phone, the "Google Play" application allows for direct carrier billing of subsequent applications purchased from the Google Play™ store. However, direct carrier billing provided by Google™ has the following drawbacks. The "Google Play" application is not open source and requires time consuming and complicated integration of servers operated by a telecommunication service provider in order for the telecommunication service provider servers to be compatible with the protocol used by Google™. If Google™ were to implement direct carrier billing with a telecommunication service provider, Google™ server protocol would need to be adapted to be compatible with that of the telecommunication service provider. Since each telecommunication service provider uses its own set of protocols, this adaptation would have to be conducted each time Google™ implements direct carrier billing with a new telecommunication service provider, making it impractical. Further, goods sold on Google Play™ are mainly listed in USD currency. If Google™ connects with a telecommunication service provider that does not transact in USD for direct carrier billing, such goods are listed in the local currency where the telecommunication service provider is based. Thus, currency risk is borne by Google™ when Google™ is paid in such local currency, instead of USD currency.

The method of FIG. 3 eliminates both the integration effort and FX risk mentioned above. Firstly (with reference to FIG. 1), simple, easy to integrate open protocols can be published that can enable a telecommunication service provider 108 to integrate their billing platform to the computing infrastructure 107, which in turn, is integrated with the server 106. These protocols configure the telecommunication service provider 108 to be able to recognise received data packets 128 that contain the unique references $114_1, \ldots, 114_n$ that identify such data packets 128 to relate to transactions that are for direct carrier billing, which triggers the telecommunication service provider 108 to make payment to the merchant 102 with which the transactions are made. The protocols also adapt the telecommunication service provider 108 to have a database 120 of such unique references $114_1, \ldots, 114_n$. There is no integration required by the merchant 102 to utilise direct carrier billing provided by the method of FIG. 3. This is because the configuration and adaptation described above affects the telecommunication service provider 108 and the server 106; the interface between the merchant 102 and the network of the acquirer 104 and the server 106 is not affected. The source of funds used to pay the merchant 102 for purchased goods does not affect payment to the merchant 102. Accordingly in the case of Google Play™ store being the merchant 102, it will still be paid in USD.

Returning to FIG. 1, in one implementation, the issuance of an account number $116_1$, assignment of the unique reference $114_1$ and transmission of the unique reference 114 may be performed by a common server, such as the server 106 through the computing infrastructure 107. The account number $116_1$ may be issued by the common server (i.e., the server 106) upon request by the telecommunication service provider 108. This could occur, for example, when the subscriber 110 requests the telecommunication service provider 108 to provide an account number that can facilitate a transaction between the telecommunication service provider 108 and the merchant 102. The telecommunication service provider 108 will then request for the server 106 to generate and transmit the account number $116_1$ to the subscriber 110.

At the computing infrastructure 107, the account number $116_1$ may be replaced with the unique reference $114_1, \ldots, 114_n$ before transmitting the unique reference $114_1, \ldots, 114_n$ and the details 118 of the transaction. The account number $116_1$ is sensitive payment information and entities storing this information have to be compliant with Payment Card Industry Data Security Standards (PCIDSS). As the telecommunication service provider 108 is typically not configured to store such sensitive payment information, the account number $116_1$ is replaced with the unique reference number $114_1$ and it is the unique reference $114_1$ that is sent to the telecommunication service provider 108. The computing infrastructure 107, connected to the server 106, is a PCIDSS compliant entity and hence stores the account number $116_1$.

When the telecommunication service provider 108 receives the data packet 128, it may be configured to determine a fund, to which the transaction is associated, from the format of the unique reference $114_1, \ldots, 114_n$. For instance, each of the unique references $114_1, \ldots, 114_n$ may contain a data field, which when processed, indicates the fund against which the transaction is to be billed. The fund may be a prepaid balance, such as a stored value card registered with the telecommunication service provider 108; or a credit line, such as a post-paid account against which a monthly telecommunication bill to the subscriber 110 is based. When billing the transaction to the identified subscriber 110, the computing infrastructure 107 may be configured to include a buffer for currency conversion when the transaction is in a currency different from the one used by the telecommunication service provider 108. This buffer allows for the computing infrastructure 107 to protect itself against currency exchange fluctuations that occur between the point when the transaction with the merchant 102 occurs to the point when the identified subscriber 110 is made to reimburse the telecommunication service provider 108 for payment made by the telecommunication service provider 108 to the merchant 102.

The format of the assigned unique reference $114_1$ may depend on the telecommunication service provider 108 to which the subscriber 110 is registered. Thus for a first telecommunication service provider, the assigned unique reference may have a first format, while for a second telecommunication service provider, the assigned unique reference may have a second format. Thus, in addition to indicating the fund against which the transaction is to be billed, the format of the assigned unique reference $114_1$ also indicates to the telecommunication service provider 108 whether the data packet 128 is meant for the telecommunication service provider 108. Accordingly, the server 106, through the computing infrastructure 107, is able to distinguish transactions between different telecommunication service providers 108 (although only one telecommunication service provider 108 is shown in FIG. 1) and the merchant 102, by assigning unique references $114_1, \ldots, 114_n$ that are in formats acceptable to the respective telecommunication service provider 108.

Figure 4:
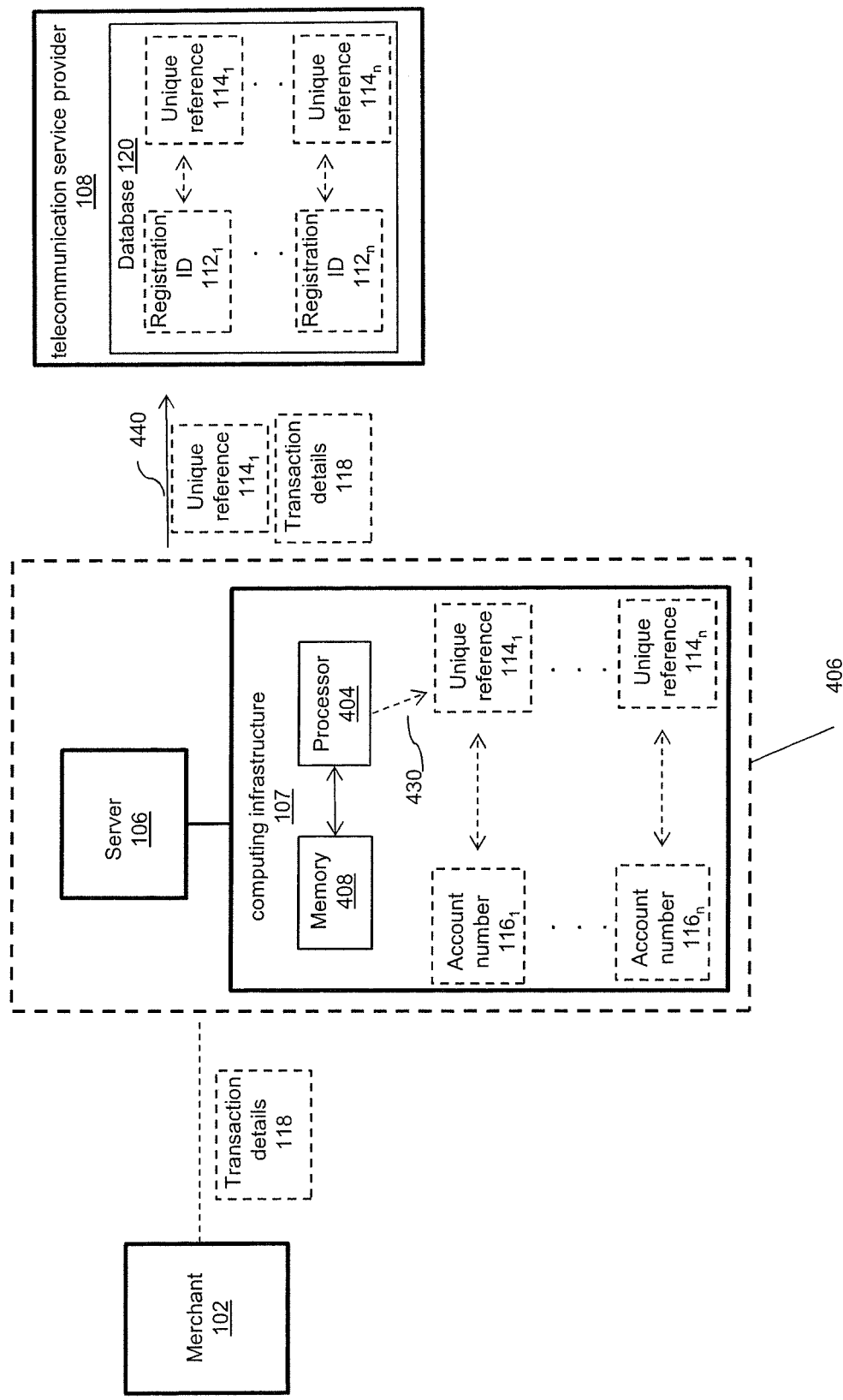
FIG. 4 shows a schematic of the server that facilitates the transaction between the telecommunication service provider and the merchant in the system of FIG. 1.

FIG. 4 shows a schematic of a server network 406 that includes both the server 106 and the computing infrastructure 107 of the system 100 of FIG. 1. The computing infrastructure 107 includes at least one processor 404 and at least one memory 408. Other components that the server network 406 may have are omitted for the purposes of simplicity.

The server 106 facilitates, through the computing infrastructure 107, a transaction between a telecommunication service provider 108 and a merchant 102. The role of the computing infrastructure 107 is to establish a process that links an account number $116_1$, against which the transaction is made, to the registration ID $112_1$ of a subscriber with the telecommunication service provider 108, the account number $116_1$ being issued to the subscriber to whom the registration ID $112_1$ belongs. This link is established as follows. Computer program code within the at least one memory 408 is configured to have the at least one memory 408, with the at least one processor 404, cause the computing infrastructure 107 at least to: assign 430 a unique reference $114_1$ that is used to map the account number $116_1$ issued to the subscriber registered with the telecommunication service provider 108. As mentioned above, the transaction with the merchant 102 is made against the account number $116_1$. The computer program code then has the at least one memory 408 and the at least one processor 404 cause the computing infrastructure 107 to transmit 440, upon receiving use of the account number $116_1$ for the transaction, the unique reference $114_1$ and details 118 of the transaction to the telecommunication service provider 108. At the telecommunication service provider 108, the unique reference $114_1$ is processed against a database 120 of unique references $114_1, \ldots, 114_n$ to identify the subscriber to which the account number $116_1$ belongs, for the telecommunication service provider 108 to associate the details 118 of the transaction to the identified subscriber.

A further role of the server 106, through the computing infrastructure 107, may be to issue the account number $116_1$ against which the transaction is made. To achieve such a role, the at least one memory 408 and the computer program code are further configured to, with the at least one processor 404, cause the server 106 to issue the account number $116_1$ against which the transaction with the merchant 102 is made before the assignment of the unique reference $114_1$.

Figure 5:
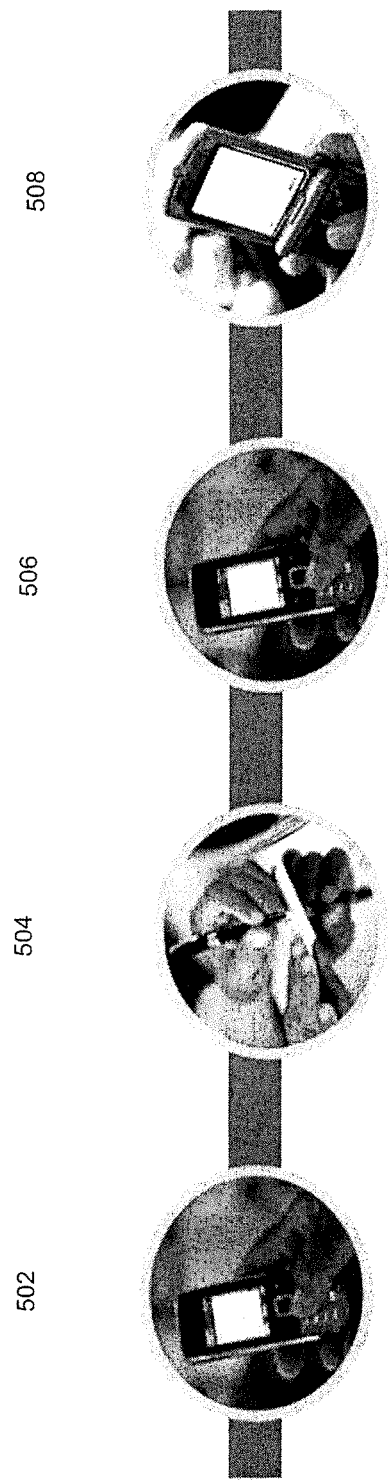
FIG. 5 shows a sequence of steps that may occur to have a subscriber register with a service provider, such as a telecommunication service provider, that allows the transaction described with respect to FIG. 3.

FIG. 5 shows a sequence of steps that may occur to have a subscriber register with a telecommunication service provider (confer the telecommunication service provider 108 of FIG. 1) that allows the transaction described with respect to FIG. 3.

In step 502, the subscriber sends a request to the telecommunication service provider. An account number (confer account number $116_1$ of FIG. 1), which may be provided by a virtual card, may then be created by a server system (confer the server 106 of FIG. 1 and the computer infrastructure 107), where purchases from a merchant are made against the account number.

In step 504, the subscriber may be authenticated to be registered with the telecommunication service provider before the subscriber is issued the account number. Such authentication may require the subscriber to enter his mobile PIN, or another authentication process that is determined by the telecommunication service provider 108.

In step 506, the subscriber is provided with the account number, where the subscriber will then be registered with the telecommunication service provider as being able to participate in the program where the telecommunication service provider makes immediate payment to the merchant for purchases made by the subscriber from the merchant. In one implementation, it may be required that the subscriber already has established a stored value account with the telecommunication service provider before registration of step 506 is allowed, such as a prepaid airtime wallet or a credit line in the case of a post-paid subscriber. In such an implementation, the subscriber may be prompted to create such a stored value account, if there is none, before allowing the registration of step 506. The account number will be linked to this stored value account in the manner described with reference to FIG. 4 (i.e., by way of a unique reference), which establishes a connection between the party that issues the account number (which, when referring to FIG. 1, may be the server 106 or the telecommunication service provider 108) and the stored value account. In one implementation, the account number may be configured to be only usable at merchants, such as the Google Play™ store, iTunes™ store, or any merchant store that requires payment instrument registration and sells digital goods.

In step 508, the subscriber may then enrol the account number for purchases, such as software applications or digital goods from merchant stores, where the purchases are eventually funded from their airtime wallet (for a prepaid consumer) or billed to their credit line (for a post-paid consumer).

Figure 6:
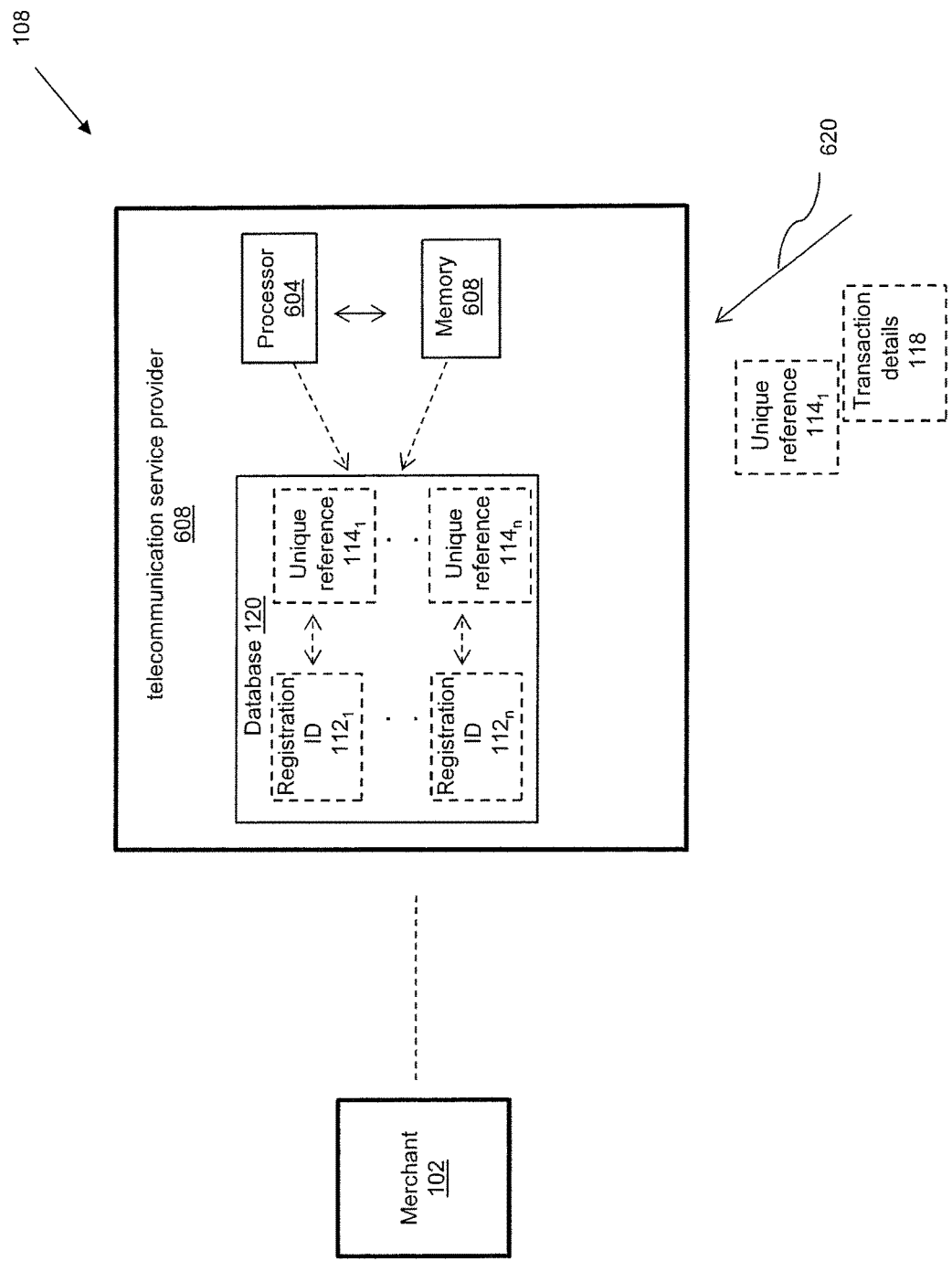
FIG. 6 shows a schematic of a server at the telecommunication service provider of the system of FIG. 1.

FIG. 6 shows a schematic of a server 608 at the telecommunication service provider 108 of the system 100 of FIG. 1. The server 608 includes at least one processor 604 and at least one memory 608. Other components that the server 608 may have are omitted for the purposes of simplicity.

The server 608 conducts a transaction with a merchant 102, where the transaction is initiated by a subscriber registered with the telecommunication service provider 108. Computer program code within the at least one memory 608 is configured to have the at least one memory 608, with the at least one processor 604, cause the telecommunication service provider server 608 to receive 620 details 118 of the transaction and a unique reference $114_1$ assigned to an account number against which the transaction is made. The unique reference $114_1$ is used to map the account number $116_1$ (see FIG. 4) to the subscriber, registered with the telecommunication service provider 108, to which the account number $116_1$ belongs. The computer program code then has the at least one memory 608 and the at least one processor 604 process the unique reference $114_1$ against a database 120 of unique references $114_1, \ldots, 114_n$ to identify the subscriber to which the account number $116_1$ belongs; and associate the details 118 of the transaction to the identified subscriber. In one implementation, the subscriber is registered with the telecommunication service provider 108 using a the registration ID $112_1$, so that the subscriber is identified from a list of registration IDs $112_1, \ldots, 112_n$ that are stored in the database 120.

Figure 7:
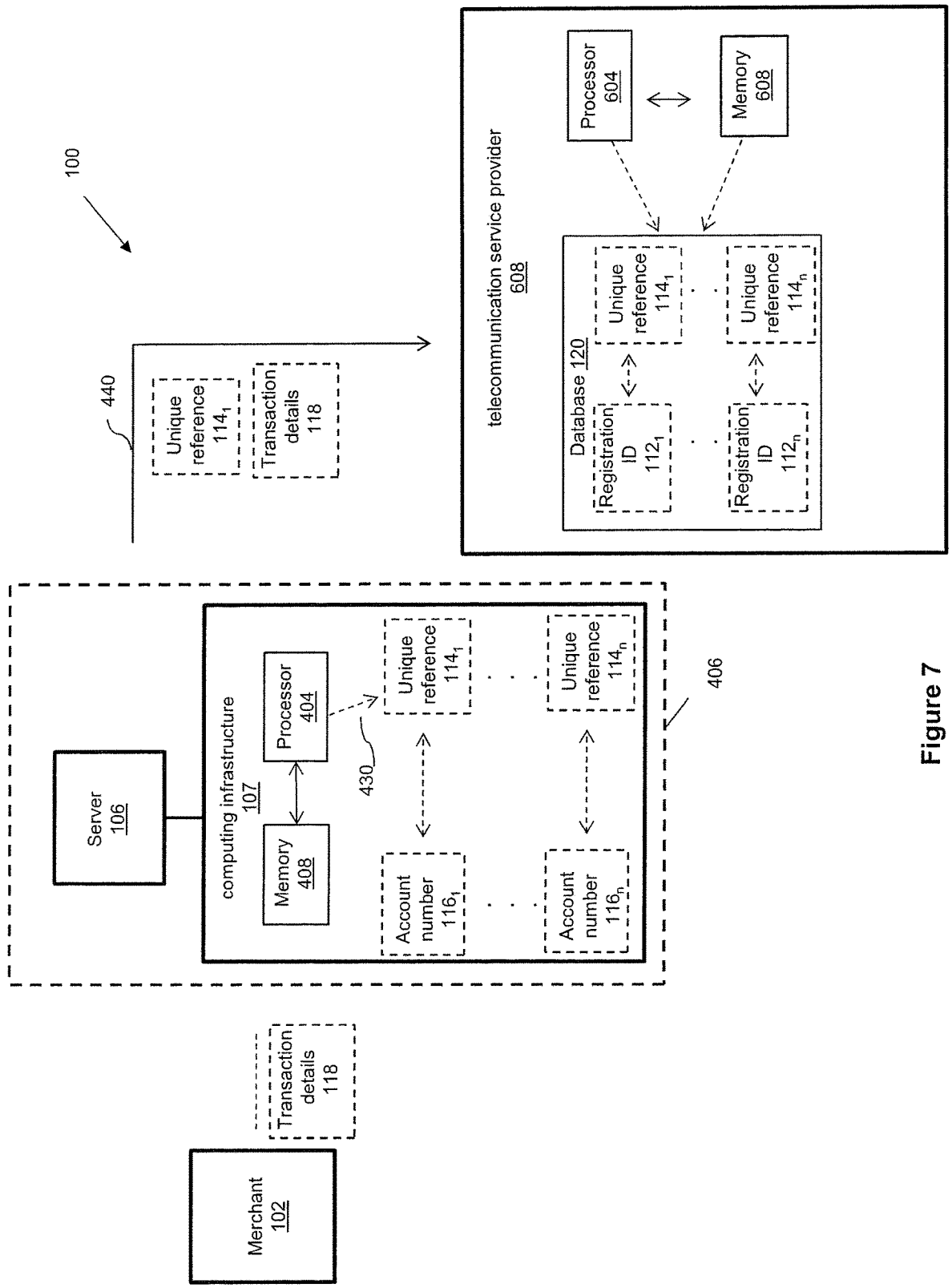
FIG. 7 shows the server of FIG. 6 in communication with the server of FIG. 4, so as to realise a system shown in FIG. 1.

FIG. 7 shows a portion of the system 100 of FIG. 1. FIG. 7 shows the server 608 of FIG. 6 in communication with the server network 406 of FIG. 4. Accordingly the system 100 that allows a transaction between a telecommunication service provider 108 and a merchant 102 has a server network 406 in communication with a telecommunication service provider server 608. The server network 406 includes at least one processor 404 and at least one memory 408. The telecommunication service provider server 608 also includes at least one processor 604 and at least one memory 608. Other components that the system 100 may have are omitted for the purposes of simplicity.

Computer program code within the at least one memory 408 is configured to have the at least one memory 408, with the at least one processor 404, cause the computer infrastructure 107 at least to assign a unique reference $114_1$ that is used to map an account number $116_1$ issued to a subscriber registered with the telecommunication service provider 108. The transaction with the merchant 102 is made against the account number $116_1$. The computer program code then has the at least one memory 408 and the at least one processor 404 cause the computer infrastructure 107 to transmit, upon receiving use of the account number $116_1$ for the transaction, the unique reference $114_1$ and details 118 of the transaction to the telecommunication service provider 608.

Computer program code within the at least one memory 608 is configured to have the at least one memory 608, with the at least one processor 604, cause the telecommunication service provider server 608 to receive the details 118 of the transaction and the unique reference $114_1$. The computer program code then has the at least one memory 608 and the at least one processor 604 process the unique reference $114_1$ against a database 120 of unique references $114_1, \ldots, 114_n$ to identify the subscriber to which the account number belongs; and associate the details 118 of the transaction to the identified subscriber. In one implementation, the subscriber is registered with the telecommunication service provider 108 using a the registration ID $112_1$, so that the subscriber is identified from a list of registration IDs $112_1, \ldots, 112_n$ that are stored in the database 120.

Any one or more of the unique references $114_1, \ldots, 114_n$ may include any one or more of numbers, letters or symbols.

Figure 8:
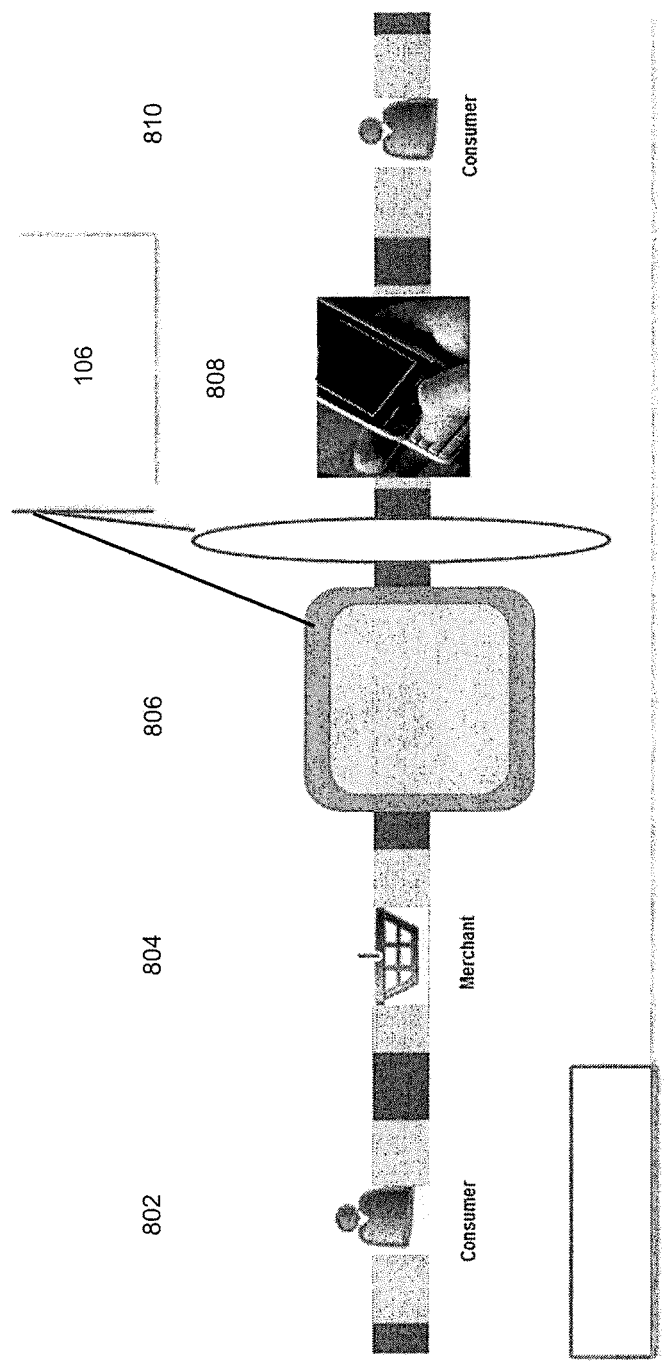
FIG. 8 shows the various stages of having the system of FIG. 1 perform a transaction with the merchant.

FIG. 8 shows the various stages of having the system 100 of FIG. 1 perform a transaction with the merchant. Each stage is described below, with reference to FIG. 1.

In stage 802, a subscriber 110 selects, for example, a software application or content to be purchased from a merchant 102 through his smart phone. The subscriber 110 selects a virtual card that is used to fund his purchases.

In stage 804, the merchant 102 submits details 118 of the transaction and the account number $116_1$ of the virtual card used for the purchases, along with other transaction information, to the acquirer 104. The acquirer 104 then sends the details 118 of the transaction and the account number $116_1$ to the server 106.

In stage 806, the server 106 assigns a unique reference $114_1$ that is used to map the subscriber 110 to the account number $116_1$. Before passing on the details 118 of the transaction and the unique reference $114_1$ to the telecommunication service provider 108 in stage 808, the following may occur. In one implementation, the server 106 may receive the details 118 of the transaction and the account number $116_1$ in a message having first format (such as ISO 8583), where the server 106, through the computer infrastructure 107, may change the message into a second format (such as XML). The unique reference $114_1$ may also replace the account number $116_1$, so that only the unique reference $114_1$ and the details 118 of the transaction are sent to the telecommunication service provider 108.

In stage 808, the telecommunication service provider 108 uses the unique reference $114_1$ to identify the subscriber 110 to which the account number $116_1$ belongs. The unique reference $114_1$ may also use the unique reference $114_1$ to identify a fund that the subscriber 110 designates to pay for purchases performed using the system 100. For instance, the subscriber 110 may have a prepaid account, such as an airtime balance, which would then be reduced by the cost of the purchases. Alternatively, the subscriber 110 may have a post-paid account, such as a credit line, to which the purchases would be billed. The telecommunication service provider 108 then confirms to the server 106 that the transaction is approved, so that payment can be released to the merchant 102

In stage 810, the merchant 102 receives payment for the transaction from the acquirer 104. The purchased goods or services are thus delivered to the subscriber 110.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

The invention claimed is:

1. A method for conducting a transaction between a service provider and a merchant of a system, the method comprising:
   issuing, by a computing infrastructure of a server, an account number against which a transaction with the merchant is made, wherein the account number belongs to a subscriber registered with the service provider and is associated with the merchant, wherein the server is located remotely from the merchant and the service provider within the system and is configured to communicate data therebetween;
   receiving, by the computing infrastructure of the server, from the merchant, a message having a first format, wherein the message includes details of the transaction and the account number;
   assigning, by the computing infrastructure of the server, a unique reference used to map the subscriber to the account number;
   replacing, by the computer infrastructure of the server, the account number with the unique reference;
   converting, by the computing infrastructure of the server, the message from the first message format to a second message format; and
   transmitting, by the computing infrastructure of the server, the converted message, including the unique reference and the details of the transaction, to the service provider, wherein the unique reference is processed by the service provider against a database of unique references mapped to registration identifiers associated with the service provider to identify a registration identifier of the subscriber to which the account number belongs, for the service provider to associate the transaction to the identified subscriber, based on the details of the transaction, wherein the account number, the unique reference, and the registration identifier are each different from one another.

2. The method of claim 1, wherein the account number is issued by a common server upon request by the service provider.

3. The method of claim 1, further comprising determining a fund, to which the transaction is associated, from a format of the unique reference.

4. The method of claim 3, wherein the fund is a prepaid balance or a credit line.

5. The method of claim 1, wherein a format of the assigned unique reference depends on the service provider to which the subscriber is registered.

6. The method of claim 1, further comprising authenticating that the subscriber is registered with the service provider before issuing the account number against which the transaction with the merchant is made.

7. The method of claim 1, wherein billing of the details of the transaction to the identified subscriber comprises including a buffer for currency conversion when the transaction is in a currency different from the one used by a server network that facilitates the transaction between the merchant and the service provider.

8. The method of claim 1, wherein the account number is a virtual card number that is used by an installed application in a mobile device.

9. The method of claim 1, wherein the unique reference comprises any one or more of numbers, letters or symbols.

10. The method of claim 1, wherein the service provider is any one or more of a telecommunication service provider, a financial services provider or an online service provider.

11. The method of claim 1, wherein the converted message is transmitted via one or more data packets, wherein the service provider is configured to recognize the one or more data packets as relating to direct carrier billing.

12. A service provider server for conducting a transaction with a merchant, the service provider server comprising:
at least one processor; and
at least one memory including computer program code;
the at least one memory and the computer program code configured to, with the at least one processor, cause the service provider server at least to:
receive, from a computing infrastructure of a server, a message including details of the transaction and an account number against which the transaction is made, wherein the account number belongs to a subscriber of a service provider and is associated with the merchant, wherein
the server is configured to be located remotely from the merchant and the service provider and is configured to communicate data therebetween,
before the service provider receives the message from the computing infrastructure of the server, the computing infrastructure of the server converts the message from a first message format to a second message format and replaces the account number with a unique reference used to map the subscriber to the account number, and
the unique reference is used by the service provider to (i) process the unique reference against a database of unique references mapped to registration identifiers associated with the service provider to identify a registration identifier of the subscriber to which the account number belongs, and (ii) associate the details of the transaction to the identified subscriber, wherein the account number, the unique reference, and the registration identifier are each different from one another.

13. The server of claim 12, wherein the at least one memory and the computer program code are further configured to, with the at least one processor, cause the server to issue the account number against which the transaction with the merchant is made before the assignment of the unique reference.

14. The service provider server of claim 12, wherein the converted message is transmitted via one or more data packets, wherein the service provider is configured to recognize the one or more data packets as relating to direct carrier billing.

15. A server network for facilitating a transaction between a service provider and a merchant, the server network comprising:
at least one processor, and at least one memory including computer program code,
wherein the server network is located remotely from the merchant and the service provider and is configured to communicate data therebetween;
the at least one memory and the computer program code configured to, with the at least one processor, cause the server network at least to:
receive, from the merchant, a message having a first format, wherein the message includes details of the transaction and an account number belonging to a subscriber of the service provider and associated with the merchant,
assign a unique reference that is used to map the account number issued to the subscriber registered with the service provider,
replace the account number included in the message with the unique reference, and
convert the message from the first message format to a second message format, and
transmit the converted message, including the unique reference and the details of the transaction, to the service provider, wherein the unique reference is processed, by the service provider, against a database of unique references mapped to registration identifiers associated with the service provider to identify a registration identifier of the subscriber to which the account number belongs, for the service provider to associate the details of the transaction to the identified subscriber, wherein the account number, the unique reference, and the registration identifier are each different from one another.

16. The server network of claim 15, wherein the converted message is transmitted via one or more data packets, wherein the service provider is configured to recognize the one or more data packets as relating to direct carrier billing.

17. A system for conducting a transaction between service providers and merchants, the system comprising:
a server network located remotely from the merchants and the service providers within the system and configured to communicate data therebetween, the server network comprising:
at least one processor; and
at least one memory including computer program code;
the at least one memory and the computer program code configured to, with the at least one processor, cause the server network at least to:
issue an account number, wherein the account number belongs to a subscriber of a service provider and is associated with a merchant, receive, from the merchant, a message having a first format, wherein the message includes details of a transaction and the account number;
assign a unique reference that is used to map the account number issued to the subscriber, wherein the transaction with the merchant is made against the account number;
replace the account number with the unique reference;

convert the message from the first message format to a second message format; and transmit the converted message, including the unique reference and details of the transaction; and a service provider server comprising:
- at least one processor; and
- at least one memory including computer program code;
- the at least one memory and the computer program code configured to, with the at least one processor, cause the service provider server at least to:
- receive, from the server network, the converted message including the details of the transaction and the unique reference;
- process the unique reference against a database of unique references mapped to registration identifiers associated with the service provider to identify a registration identifier of the subscriber to which the account number belongs; and
- associate the details of the transaction to the identified subscriber, wherein the account number, the unique reference, and the registration identifier are each different from one another.

18. The system of claim 17, wherein the converted message is transmitted via one or more data packets, wherein the service provider is configured to recognize the one or more data packets as relating to direct carrier billing.

* * * * *